(12) United States Patent
Zhang

(10) Patent No.: US 7,889,989 B2
(45) Date of Patent: Feb. 15, 2011

(54) METHOD FOR IMPLEMENTING TANDEM CONCATENATION MONITORING AUTOMATICALLY AND APPARATUS THEREOF

(75) Inventor: Jianmei Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 428 days.

(21) Appl. No.: 12/047,792

(22) Filed: Mar. 13, 2008

(65) Prior Publication Data

US 2008/0212961 A1   Sep. 4, 2008

Related U.S. Application Data

(63) Continuation of application No. PCT/CN2006/003201, filed on Nov. 28, 2006.

(30) Foreign Application Priority Data

Feb. 7, 2006   (CN) ........................ 2006 1 0002856

(51) Int. Cl.
*H04B 10/25* (2006.01)
(52) U.S. Cl. ............................... 398/25; 398/17; 398/33
(58) Field of Classification Search ........................ None
See application file for complete search history.

(56) References Cited

U.S. PATENT DOCUMENTS

| | | | | |
|---|---|---|---|---|
| 2002/0067698 A1* | 6/2002 | Gourley et al. | ............... | 370/248 |
| 2003/0097472 A1* | 5/2003 | Brissette | ..................... | 709/245 |
| 2003/0115307 A1* | 6/2003 | Brissette | ..................... | 709/223 |
| 2003/0231638 A1* | 12/2003 | Huck et al. | ................. | 370/400 |

| | | | |
|---|---|---|---|
| 2005/0086555 A1 | 4/2005 | Langridge | |

FOREIGN PATENT DOCUMENTS

| | | |
|---|---|---|
| CN | 1620000 A | 5/2005 |
| EP | 1 041 760 A1 | 10/2000 |
| JP | 9-247201 A | 9/1997 |
| JP | 10-334011 A | 12/1998 |

OTHER PUBLICATIONS

International Search Report from PCT/CN2006/003201 mailed on Mar. 8, 2007.
Search Report issued in corresponding European Patent Application No. 06817917.5; mailed Aug. 11, 2008.

* cited by examiner

*Primary Examiner*—Chi H Pham
*Assistant Examiner*—Kouroush Mohebbi
(74) *Attorney, Agent, or Firm*—Brinks Hofer Gilson & Lione

(57) ABSTRACT

A method for automatically implementing Tandem Concatenation Monitoring (TCM), includes: requesting a network management system for a required number of TCM levels; assigning an available TCM level to a pair of network nodes in a sub-network; performing TCM processing, mapping TCM use information into a corresponding overhead, transferring the TCM use information together with TCM overhead information downstream, and reporting TCM information to the network management system; and extracting TCM monitored information, determining transmission quality of each sub-network of a set of sub-networks, and locating a network failure. The invention also presents a device for automatically implementing TCM, including a controller, a TCM generator and a TCM terminator which cooperate with each other to automatically implementing a TCM function. The invention addresses the poor flexibility and complexity due to a static configuration by the network management system, and thus improves the flexibility of the TCM processing.

19 Claims, 7 Drawing Sheets

METHOD FOR IMPLEMENTING TANDEM CONCATENATION MONITORING AUTOMATICALLY AND APPARATUS THEREOF

The present application is a continuation of PCT Application No. PCT/CN2006/003201, filed on Nov. 28, 2006, which claims a priority to Chinese Patent Application No. 200610002856.8, filed on Feb. 7, 2006. All of these applications are incorporated herein by reference for all purposes.

FIELD OF THE INVENTION

The present invention relates to the field of optical communication networks and in particular to a method and device for automatically implementing Tandem Concatenation Monitoring (TCM) in a multi-operator and multi-vendor context in an Optical Transport Network (OTN).

BACKGROUND OF THE INVENTION

In the optical communication field, the OTN incorporates the operatability and manageability of a Synchronous Digital Hierarchy/Synchronous Optical Network (SDH/SONET) as well as the large capacity of a Wavelength Division multiplexing (WDM) network, and gradually becomes an underlying network for optical communication systems. The OTN defines a layered network model. An optical layer includes an Optical Transport Section (OTS) layer, an Optical Multiplex Section (OMS) layer and an Optical Channel (OCH) layer. In an electrical layer network, an Optical Channel Transmission Unit (OTU), an Optical Channel Data Unit (ODU) and an Optical Channel Payload Unit (OPU) are defined. Specifically, the OPU is used to carry client traffic, the ODU defines management and maintenance functions required in end-to-end transmission through an optical channel, and the OUT provides management and maintenance functions required in transmission of an ODU signal. The OTN has a significant advantage over the SDH/SONET in that the OTN provides 6 levels of Tandem Concatenation Monitoring (TCM) which provide functions of concatenation monitoring and failure locating in a multi-operator application context. The TCM involves functions such as connectivity monitoring, signal quality monitoring, failure and alarm conveying.

A Trail Trace Identifier (TTI) is a 64-byte string including a source node identifier and a destination node identifier for OTN frame transmission over the network. The TTI may be used to determine whether or not a frame signal arrives at an output port of a designated destination node from a designated source node in the network. A Bit Interleaved Parity (BIP-8) is used for traffic quality monitoring. As specified in the G.709, a source end performs a bit parity check on an OPU field of the $N^{th}$ frame by using the BIP-8, and stores a check result into an BIP-8 field of the TCM of the $(N+2)^{th}$ frame. A destination end performs the same bit parity check on the OPU field, and compares a parity check result with the BIP-8 value extracted from the corresponding location. If the two values are identical, it is indicated that no error has been introduced in the network between the source end and the destination end; otherwise it is indicated that errors have been introduced in the network through which the traffic goes. In addition, the TCM defines a 4-bit Backward Error Indication (BEI) field used to convey errors detected in the network to the upstream source node. What is transferred by the BEI is the count of interleaved-bit blocks that have been detected in error at the destination end. The TCM also defines a 1-bit Backward Defect Indication (BDI) used to transfer a signal fail status of the network to the upstream source end, so that the source end may detect a failure in the network.

In the conventional technical solution, the G.709 defines 6 levels of TCMs. The multiple levels of TCMs are used to monitor status of the interior of each sub-network, and to locate a failure. Up to 6 levels of TCM may be performed simultaneously on a network node. In a conventional method, a centralized Network management system (NM system, and NM for short) assigns a corresponding TCM to each of the nodes in the entire network for monitoring, and then each of the nodes reports the network status information detected through the TCM to the NM. The NM in turn determines network failure information.

FIG. 1 is an application example in which the NM assigns TCM levels centrally, and illustrates a network configuration scenario as below: there is a large sub-network between nodes A1 and A2, with the nodes A1 and A2 as boundaries of the sub-network; and client traffic enters the sub-network from the node A1/A2, goes through the sub-network, and leaves the sub-network from the node A2/A1. There are multiple sub-networks included in the A1-A2 sub-network, such as the sub-networks respectively between A1 and A6, A1 and A4, as well as A3 and A5, as shown in FIG. 1, and these sub-networks may be constituted with devices of different vendors managed by the same operator. Respective sub-networks are also formed between B1 and B2, C2 and C2, as well as D1 and D2, and these sub-networks may be constituted with different devices managed by different operators. Thus, the client traffic goes through the sub-networks sequentially after entering the sub-network between A1 and A2 from the boundary node A1, and then leaves the sub-network from the boundary node A2. In such a multi-operator/multi-vendor network context, services provided by each of the sub-networks need to be monitored to allow precise locating of a failure. The NM assigns a TCM level to each of the sub-networks respectively according to the condition of the entire network, as illustrated in FIG. 1. The sub-network between A1 and A2 is monitored at TCM1, the sub-network between A1 and A6 is monitored at TCM2, the sub-network between A1 and A4 is monitored at TCM3, the sub-network between A4 and A5 is monitored at TCM4, the sub-network between B1 and B2 is monitored at TCM2, the sub-network between C1 and C2 is monitored at TCM3, and the sub-network between D1 and D2 is monitored at TCM2. The sub-network nodes report their detected network performance data to the NM, and the NM determines service performance of the individual sub-networks according to TTI, BIP-8, BEI, BDI, etc., as reported from the sub-networks corresponding to the respective TCMs.

In the prior art, the NM centrally configures at which level of TCM the information should be monitored on each sub-network and each node. This may not lead to significant disadvantages in the case of a small scale of the network and relatively simple networking context. However, as the openness of the network is improved and both the scale and the complexity of the network increase continuously, the technique solution that the NM fixedly assigns a TCM level at which each sub-network or each node monitors has a limited flexibility and increases the complexity of configuration and processing. Especially in the case that a TCM level has to be added or deleted due to a change in network distribution, the NM is required to reconfigure the TCM level for each network node, and to determine network failure information by querying new TCM performance data, resulting in complex processing.

FIG. 2 is an example in which the NM reassigns TCMs due to a change in network topology/sub-network monitoring. When a change in the network distribution occurs, i.e., a change in the B1-B2 sub-network segment as shown in FIG. 2 occurs, the D1-D2 sub-network segment can not be monitored at TCM2 if the B1-B2 sub-network is still monitored at TCM2. At this point, the NM is required to reassign TCM levels at which the individual sub-networks and network nodes are monitored. In this example, the NM assigns TCM4 to the D1-D2 sub-network for monitoring network service quality. The NM analyzes network service quality information reported from the respective network nodes according to the updated TCM levels, and then locates a failure. Thus, each time a change in network distribution or sub-network partition occurs, it is required to reconfigure the TCM levels and re-extract the performance data, resulting in complex processing.

Moreover, in addition to being downloaded to each sub-network, TCM level assignment information from the NM has to be downloaded to each network element node, and the NM may receive from each network element node only TCM monitored information (including TTI Identifier Mismatch (TIM) alarm information, BIP-8 error statistics, BEI error statistics, a BDI backward defect indication, etc.). Such monitoring information may not indicate which TCM level the information belongs to and which pair of network element nodes the information is processed by. Which TCM level the TCM monitored information belongs to has to be acquired by the NM in a unidirectional control.

SUMMARY OF THE INVENTION

Embodiments of the present invention intend to provide a method and a device for automatically implementing TCM, so as to address the limited flexibility and complex configuration and processing in centrally configuring of each sub-network and each network node by the NM in the prior art.

A method for automatically implementing TCM includes:

requesting, by each of sub-network of a set of sub-networks, a network management system for a required number of TCM levels;

assigning, by the network management system, available TCM levels to a pair of network nodes in a first sub-network of the set of sub-networks;

performing, by the pair of network nodes in the sub-network, TCM processing, mapping TCM use information into a corresponding overhead, transferring the TCM use information together with TCM overhead information downstream, and reporting TCM information to the network management system; and extracting, by the network management system, TCM monitored information, determining transmission quality of each of the sub-networks, and locating a network failure.

A device for automatically implementing Tandem Concatenation Monitoring, TCM, includes a controller, a TCM generator and a TCM terminator;

the controller is adapted to control information transfer between a present network element and an exterior of the node, and to control the TCM generator and the TCM terminator;

the TCM generator is adapted to receive information from the controller, to perform TCM processing, to map TCM use information into an overhead for transfer, and to convey updated TCM Activation information to the controller; and the TCM terminator is adapted to receive information from the controller and an external overhead interface, to process TCM overhead information, to update the TCM use information, and to convey a processing result to the controller.

The solutions of the present invention are advantageous in that each sub-network requests for a required number of TCM levels. The NM determines the TCM levels currently available to be assigned to the sub-network according to a TCM assignment map, and makes a response. The sub-network assigns an assigned TCM level to the network element nodes. The nodes process their respective TCM level, and report TCM monitored information, TCM use information and TCM operation information to the NM. According to the information, the NM updates the TCM assignment map and locates a failure, thus achieving the purpose of automatically implementing TCM processing without the NM assigning a fixed TCM level to each network element node, and hence decreasing the complexity of configuration and processing.

BRIEF DESCRIPTIONS OF THE DRAWINGS

DETAILED DESCRIPTIONS OF THE EMBODIMENTS

Exemplary embodiments of the invention are described hereunder in detail in combination with the accompanying drawings.

Figures 4, 5:
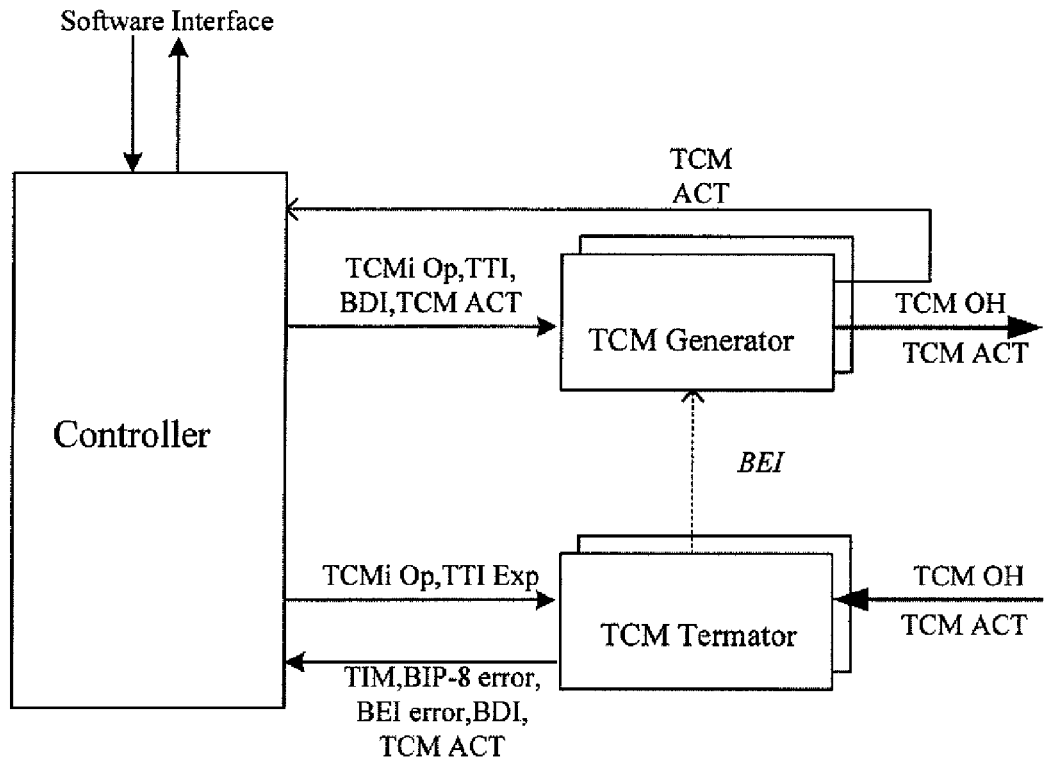
FIG. 4 is a schematic diagram illustrating a device for automatically implementing TCM function according to an embodiment of the invention.
FIG. 5 is a schematic diagram illustrating an overhead definition for an OTN frame structure.

A structure of an OTN frame as defined in the G709 is illustrated in FIG. 5. The ODUk overhead involves 6 levels of TCM functions, that is, each node can process up to 6 levels of TCMs.

Figure 6:
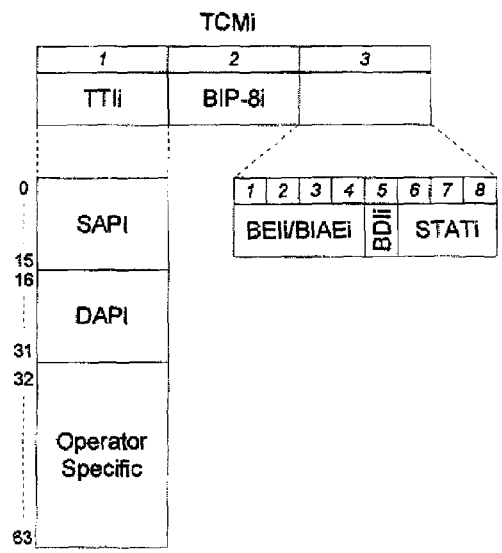
FIG. 6 is a schematic diagram illustrating a TCM overhead definition.

A TCM overhead is defined as illustrated in FIG. 6. Each TCMi includes 3 byte fields. The TTI is a 64-byte string, in which the first 16 bytes is a Source Access Point Identifier (SAPI), the next 16 bytes is a Destination Access Point Identifier (DAPI), and the last 32 bytes is operator specific information. Source and destination access point identifiers and operator specific information are added into the TTI field of the OTN frame at a TCM-managed source node, and the information in the TTI field is extracted and compared at a destination node with information that has been negotiated by the source node and the destination node. If the extracted information and the negotiated information are identical, it is indicated that the concatenation over the channel is right. If the extracted information and the negotiated information are not consistent with each other, it is indicated that the concatenation over the channel is wrong. The BIP-8 field carries a value for 8-bit parity check on an OPU payload field. The source node inserts a value calculated over the OPU field through a BIP-8 calculation into the BIP-8 field of a corresponding frame. The destination node firstly performs the BIP-8 calculation on the OPU field, and compares a calculated value with a BIP-8 value extracted from the corresponding field. If the calculated value and the extracted value are identical, it is indicated that no error is introduced during the service transmission over a sub-network between the source node and the destination node; otherwise it is indicated that errors are introduced in the sub-network. In this way, the quality of the sub-network may be determined. The destination node conveys the number of inconsistent bits (ranging from 0 to 8) generated through BIP-8 comparison to the source node with the BEI, and the source node may determine from the value of the BEI that errors have been introduced during the transmission over the sub-network. Alike, the destination node conveys its detected information of a network failure to the source node with the BDI, and the source node may determine the failure of the sub-network from the value of the BDI. The other fields BIAE/STAT are not very relevant to the invention.

Figure 1:
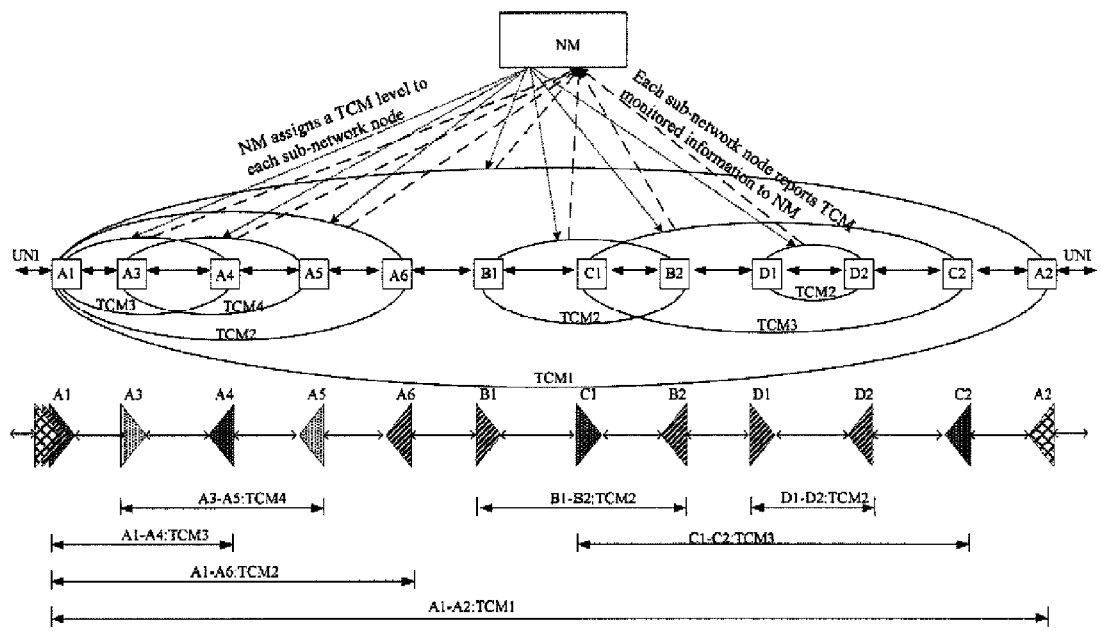
FIG. 1 is a schematic diagram illustrating an application example in which an NM assigns TCM levels centrally.
Figure 2:
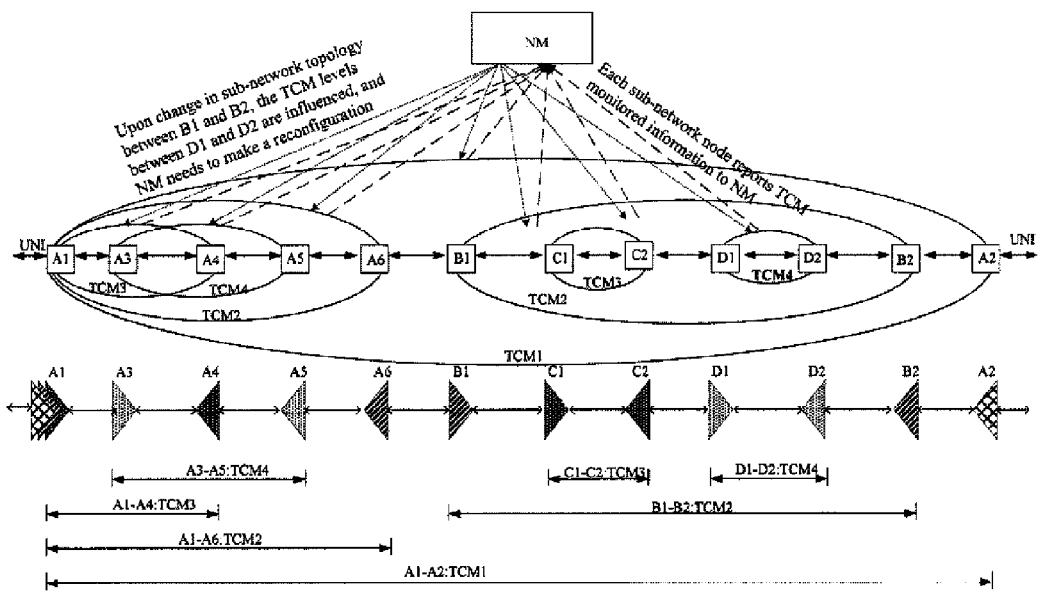
FIG. 2 is a schematic diagram illustrating an example in which an NM reassigns TCMs due to a change in network topology/sub-network monitoring.
Figure 3:
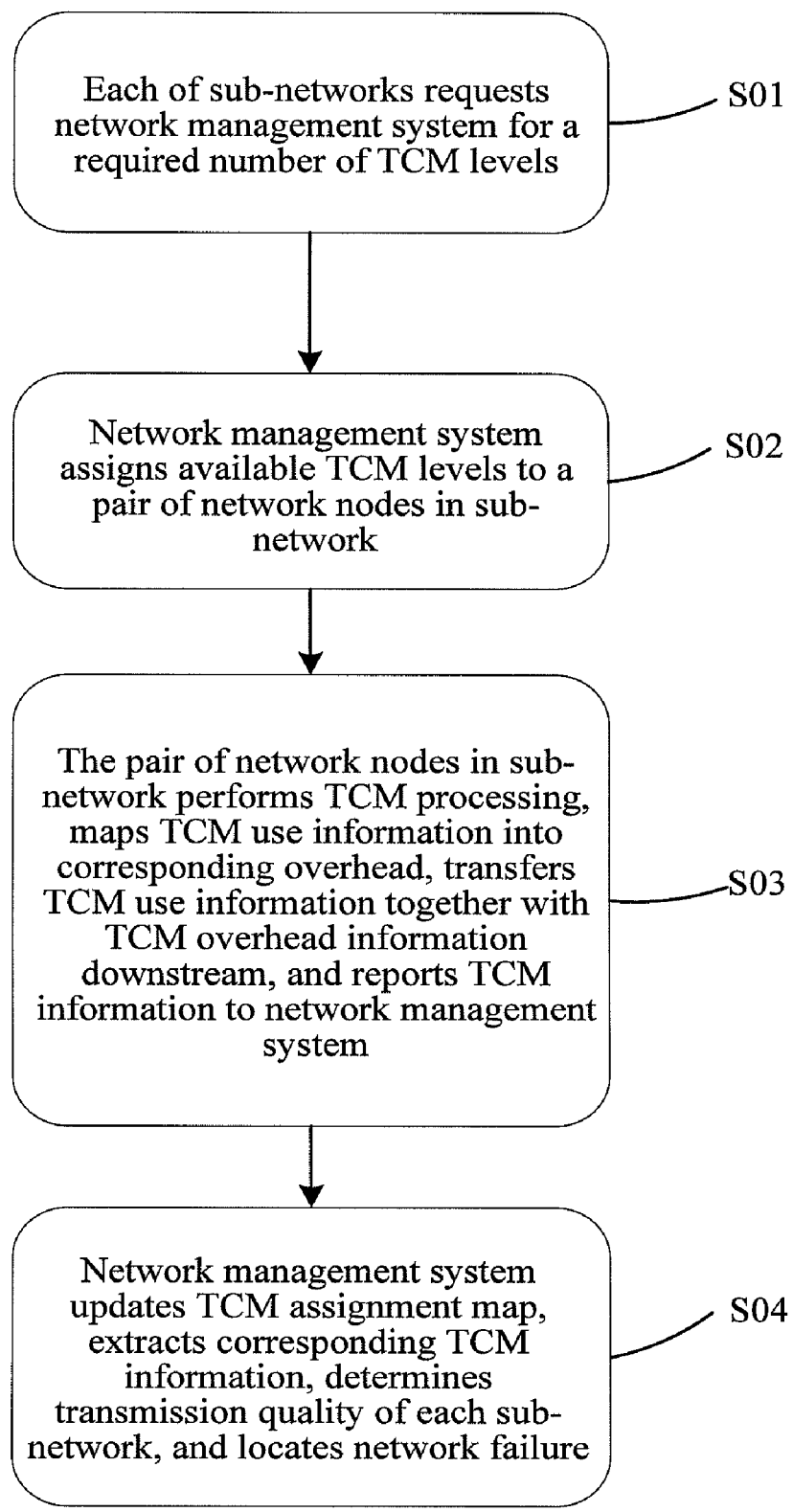
FIG. 3 is a flow chart illustrating operation process according to an embodiment of the invention.

Referring to FIG. 3, specific operation process of implementing TCM according to an embodiment of the present invention is described as follows.

In block S01, each of sub-networks requests the network management system (NM) for a required number of TCM levels.

In block S02, the network management system assigns available TCM levels to a pair of network nodes in the sub-network.

In block S03, the pair of network nodes in the sub-network performs TCM processing, maps TCM use information into a corresponding overhead, transfers the TCM use information together with TCM Overhead (TCM OH) information downstream, and reports TCM information to the network management system.

In block S04, the network management system updates a TCM assignment map, extracts the corresponding TCM information, determines transmission quality of each of the sub-networks, and locates a network failure.

Specifically, in block S01, each of the sub-networks determines a network segment on which TCM monitoring needs to be performed according to the network distribution relationship of the sub-network, and determines the required number of TCM levels for this corresponding network segment according to a monitoring demand of the network segment. The network management system determines whether there is an available TCM level according to the current TCM assignment map. The sub-network receives information on the available TCM levels assigned by the NM, and assigns a corresponding TCM level to the pair of network nodes in the sub-network according to the monitoring demand of the sub-network segment.

Specifically, in block S03, the TCM processing includes processing of TTI, BIP-8, BEI and BDI. The TCM overhead information transferred downstream includes a TTI identifier, BIP-8 bit interleaved parity information, a BEI and a BDI. The TCM information reported to the network management system includes TCM monitored information, TCM use information and TCM operation information. The TCM monitored information reported to the network management system includes a TIM alarm indication, BIP-8 error statistics, BEI error statistics and BDI failure information.

Specifically, in block S04, the network management system updates the TCM assignment map according to the TCM use information and the TCM operation information reported from each network node, and the updated TCM assignment map may be used as a basis in assigning a TCM level when another sub-network requests for the TCM level. The network management system gets information on the use of TCM by each node from the TCM assignment map, extracts the TCM monitored information, and determines the transmission quality of each of the sub-networks and locates a network failure according to the TCM monitored information.

A specific procedure for implementing TCM will be described hereunder by a practical example of a network.

Figure 7:
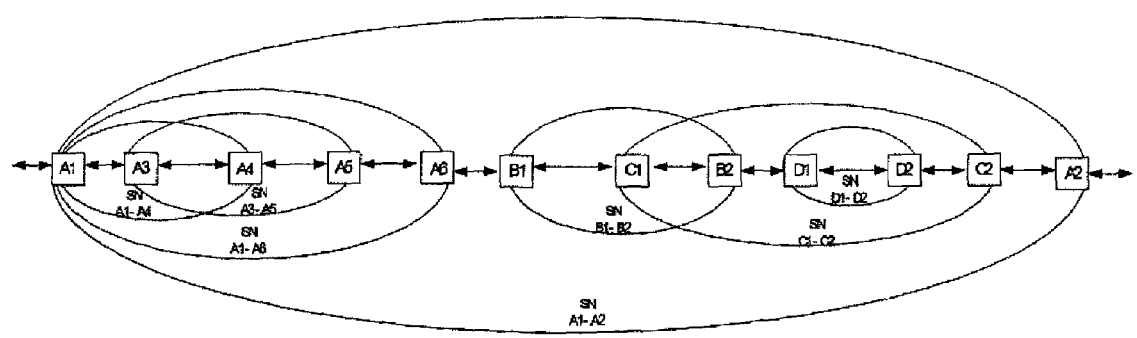
FIG. 7 is a schematic diagram illustrating an example of a network topology.

Physical distribution of the network is shown in FIG. 7. A large sub-network is formed, with nodes A1 and A2 as boundaries of the sub-network. This sub-network includes several small sub-networks, i.e. Sub Network (SN) A1-A6, SN B1-B2 and SN C1-C2. The sub-network SN A1-A6 includes two sub-networks SN A1-A4 and SN A3-A5, and the sub-network SN C1-C2 includes a sub-network SN D1-D2. A sub-network may be defined according to management area. For example, different operators' networks may be defined as different sub-networks, and also the same operator's networks constructed with devices from different vendors may be defined as a sub-network. A network may include one or more sub-networks. All sub-networks in a network may be managed by a centralized NM. Each of the sub-networks has a node having a direct relationship with the network management system system. Such a node is referred to as a gateway network element. Other network nodes in the sub-network are managed by the network management system through this node (i.e., the gateway network element).

In order to monitor a service accessing the network from the boundary node A1 or A2 and going through each of the sub-networks sequentially, each of the sub-networks requests the NM for TCM monitoring according to concatenation monitoring condition of the sub-network. The sub-network SN A1-A2 firstly initiates a request to the NM for TCM monitoring (requesting for one TCM level). The NM conveys TCM level(s) available to SN A1-A2 according to currently available TCM resources (TCM1~TCM6 each are available). Upon receipt of the response, SN A1-A2 determines using TCM1 for monitoring the concatenations between A1 and A2. For a unidirectional concatenation with A1 as a source node and A2 as a destination node, TCM TTI inserting and TCM1 BIP-8 calculation and inserting are performed at the node A1. Information in the TTI is extracted and compared with expected values at the node A2, and if the extracted information is inconsistent with the expected values, a TTI Identifier Mismatch (TIM) alarm is generated. A BIP-8 is calculated and another BIP-8 is extracted, and the two BIP-8s are compared with each other. If the calculated BIP-8 and the extracted BIP-8 are not consistent, BIP-8 errors occur and are counted, and the number of the BIP-8 errors is conveyed with the BEI to the source node A1 and a failure detected by the destination node A2 is conveyed with the BDI to the source node A1. For a unidirectional concatenation with A2 as a source node and A1 as a destination node, the same processing may also work. In this way, the nodes A1 and A2 both may report TCM1 monitoring information to the NM.

The TCM assignment map correlates with the physical distribution of the network, and defines assignment and use of TCMs in the individual sub-networks. Prior to setting up a TCM concatenation monitoring, the TCM assignment map includes no information.

Figure 8:
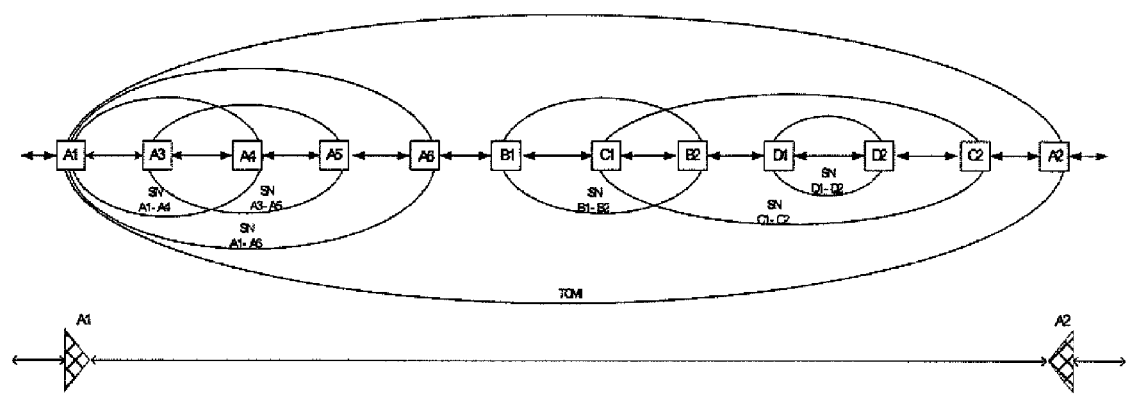
FIG. 8 is a schematic diagram illustrating a TCM assignment.

In the case that the sub-network A1-A2 uses TCM1 for monitoring the concatenations between A1 and A2, the nodes A1 and A2 both report the processing of the TCM1 to the NM. A TCM Op byte may be defined so that each TCMi level may be assigned with a corresponding operation code indicating whether the node has processed the TCMi. According to the information reported by the nodes A1 and A2, the NM may determine that the TCM1 has be used by the pair of nodes A1 and A2 inbetween SN A1-A2, and thus generates a TCM assignment map as illustrated in FIG. 8. In this way, the information reported by the nodes includes information regarding which TCM level the TCM monitored information belongs to.

Figure 9:
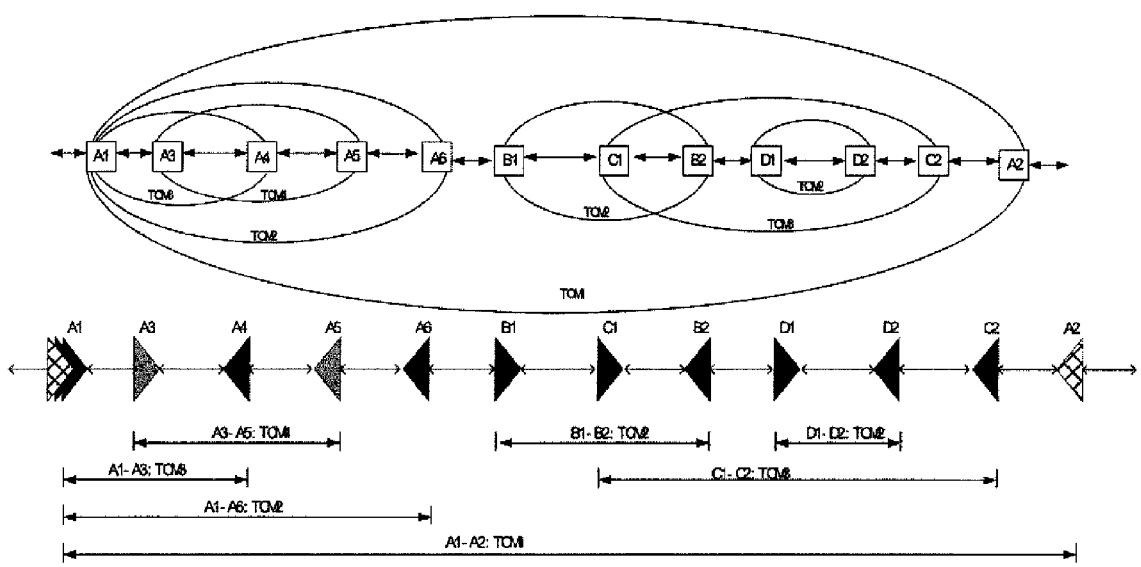
FIG. 9 is a schematic diagram illustrating an updated TCM assignment.

Other sub-networks may also request the NM for TCM concatenation monitoring, according to a concatenation monitoring demand of their respective network segments. The NM determines which TCM levels are available according to the TCM assignment map, and conveys information on the available TCMs to the sub-networks. Upon receipt of the information on the available TCMs conveyed from the NM, each of the sub-networks performs a TCM processing similar to the above processing, and each of the network nodes reports to the NM the TCM monitored information and the TCM use information processed by the node. Upon receipt of the TCM use information from the individual network nodes, the NM updates the TCM assignment map, and an updated TCM assignment map is shown in FIG. 9.

Then NM may easily locate a failure according to the TCM assignment map and the TCM monitored information reported from the individual nodes.

Figures 10, 11, 12:
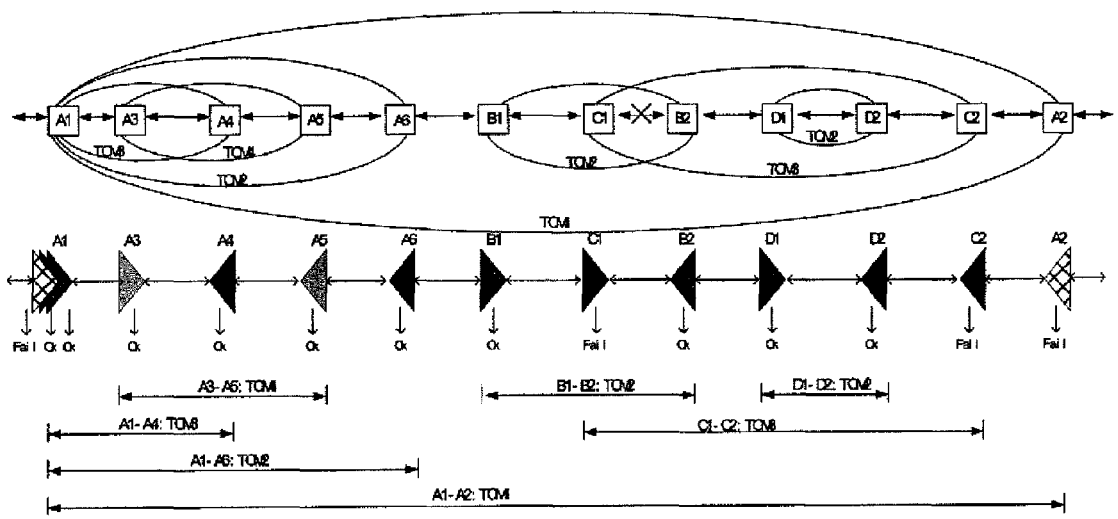
FIG. 10 is a schematic diagram illustrating status of TCM monitored information reported from individual nodes upon a link failure between B2 and D1.
FIG. 11 is a schematic diagram illustrating a definition of a TCM ACT field.
FIG. 12 is a schematic diagram illustrating a definition of a TCM Op field.

Referring to FIG. 10, a failure occurs on a link between B2 and D1. This failure may influence the TCM processing between C1 and C2 as well as that between A1 and A2, but have no influence on D1-D2, B1-B2 and those preceding sub-networks. Consequently in the TCM monitored information reported to the NM, C1, C2, A1 and A2 report a failure (Fail), while other nodes report no failure (Ok), so the NM may easily determine that a failure occurs in the network segment between B1 and D1.

Specifically, a procedure for transferring the TCMi use information is described as follows.

Each network node receives TCMi level information that the network node should process from a gateway network element node of the sub-network to which the network node belongs, and transfers the TCMi use information to a downstream node in addition to processing a corresponding TCMi monitoring overhead. Upon arrival at a TCMi destination node, the TCMi use information is terminated. Here, A TCM Activation (TCM ACT) defined for the OTN is used to indicate whether a TCMi (i.e. TCM1~6) has been used. This TCM ACT field includes all the TCM levels that have already been used. The above example is described hereunder in detail.

Firstly a structure of the TCM ACT field is defined. The upper 6 bits of the TCM ACT are assigned respectively for TCM1~TCM6. A bit of 1 indicates that the corresponding TCMi has been used already (i.e. an active TCM level). A bit of 0 indicates that the corresponding TCMi has not been used. The last 2 bits of the TCM ACT field may be used in checking the preceding 6 bits so as to ensure integrity of transmission of the TCM ACT information. The TCM ACT is generated at the TCM source node, and is terminated at the TCM destination node.

The nodes A1 and A2 are assigned with TCM1 for use. The source node A1 maps information on the use of TCM1 into the TCM ACT field. When the processing of TCM1 is completed, the TCM ACT field has a value of 100000xx (in which xx is a check value of the preceding 6 bits). Further, the node A1 also belongs to the sub-networks A1-A6 and A1-A4, and is thus required to process TCM2 and TCM 3. Consequently, the value of TCM ACT output from the node A1 is 111000xx.

When the TCM ACT is transferred to the node A3, because the nodes A3-A5 are assigned with TCM4 for use, the TCM ACT field is 111100xx after the source node A3 of TCM4 completes the processing of TCM4. When TCM ACT is transferred to the node A4, A4 terminates the TCM3 overhead, and reports corresponding TCM3 monitoring information. As a destination node for the TCM3 processing, the node A4 needs to terminate the TCM3 field of the TCM ACT. Consequently, the value of the TCM ACT output from the node A4 is 110100xx. Values of the TCM ACT output from the other nodes are processed in the same way. A format of the TCM ACT is shown in FIG. 11.

Each of the network nodes is required to report to the NM the TCMi operation information (TCMi Op) of the node pair to which the node belongs, in addition to reporting the TCM ACT information output from the node itself to the NM. In this regard, a one-byte TCM Op field is also defined as an identifier reported from each of the nodes to the NM, identifying the operating of the TCMi by the node. In the TCM Op field, 6 bits are assigned respectively for TCM1~TCM6. A bit of 1 indicates that the node has processed the corresponding TCMi, and a bit of 0 indicates that the node has not processed the corresponding TCMi. The remaining 2 bits of the TCM Op field may be used for check so as to ensure integrity of the significant information. Upon receipt of an operable TCM level, each of the nodes sets the TCM Op, creates and terminates corresponding TCM monitored information according to the operation information, and reports the TCM Op information to the NM, without transferring the TCM Op along with the TCM monitoring overhead. A format of the TCM Op is shown in FIG. 12.

The NM receives the output TCM ACT information and the TCM Op information reported from each of the nodes, and by comparing the TCM ACT information and the TCM Op information, determines the TCM levels that pass through the node and have been actually used already and which level of TCMi the node is processing. In this way, the NM may construct the complete TCM assignment over the entire network, and determine the available TCM levels remaining for each network segment.

Figure 13:
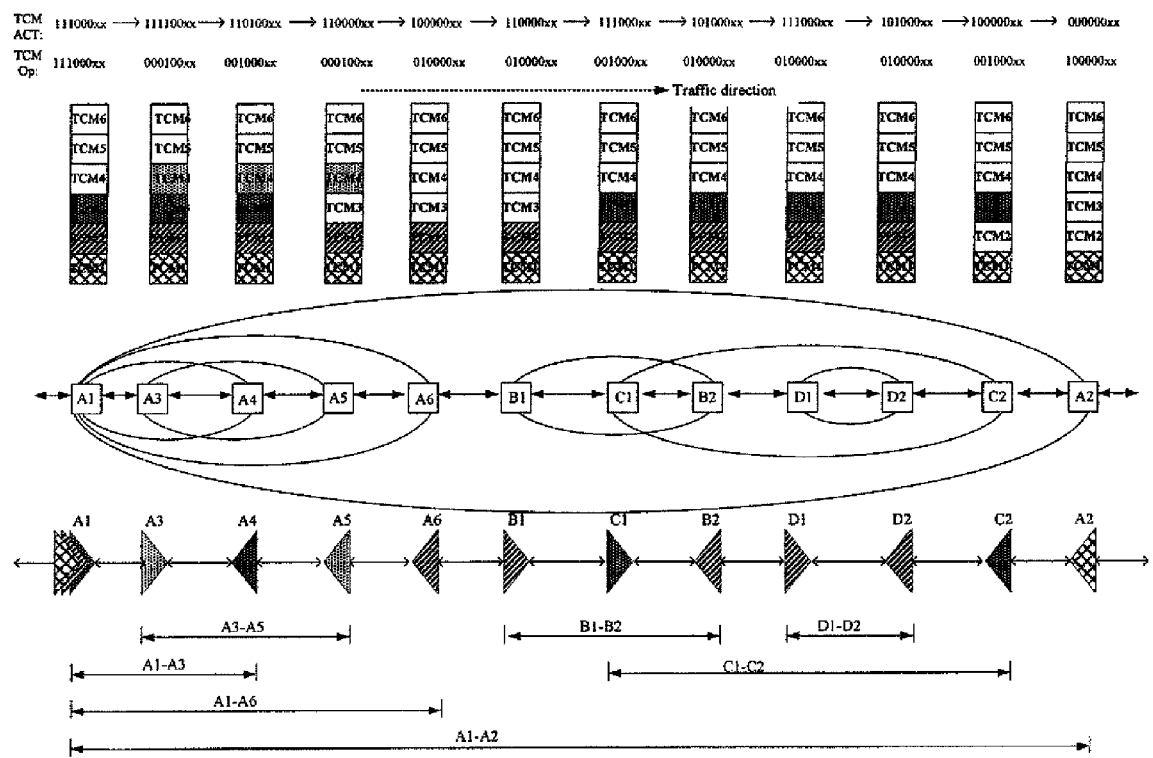
FIG. 13 is a schematic diagram illustrating complete information on assignment and use of TCMs as obtained by an NM.

For the above illustrative network, after the processing as described above, the values of TCM ACT, the values of TCM Op output from the individual nodes and the complete TCM assignment are as illustrated in FIG. 13. The NM may implement the TCM function automatically according to the TCM assignment and the TCM monitored information.

The inventive method for implementing TCM automatically may be implemented by a device as illustrated in FIG. 4. This device is connected with the NM via a software interface. The device includes a controller, a TCM generator and a TCM terminator. The network management system receives information such as the TCM monitoring overhead, the TCM ACT and TCM Op via the software interface, and thereby implements the TCM function. The controller controls the information transfer between the NM, the individual sub-networks, the gateway network element and the ordinary network elements in the individual sub-networks, the TCM generator, and the TCM terminator. The TCM generator receives information from the controller, processes a corresponding TCM overhead, and conveys updated TCM ACT information to the controller. The TCM terminator receives information from the controller and an external overhead interface, processes a TCM overhead according to the information, conveys a processing result to the controller, and processes the received TCM operation information and conveys a processing result to the controller. The specific function of these components is implemented as follows.

A node where the controller is located, when serving as a gateway network element of a sub-network where the node is located, determines the required number of TCM levels for the sub-network, requests the NM for the TCM levels as required on behalf of the sub-network, and sends a TCM level for monitoring to individual ordinary network elements in the sub-network. The node where the controller is located, when serving as an ordinary network element of the sub-network where the node is located, receives an available TCM level(s) sent from a gateway network element of the sub-network. The controller sends TCM ACT information, TCMi Op information, BDI information and TTI information to the TCM generator, with the TCM ACT information containing the levels of the TCMs as used already, and the TCM Op information indicating a TCM level at which the node operates. The controller sends the TCMi Op information and a TTI expected value, i.e., TTI Exp, to the TCM terminator. The controller receives from the TCM generator TCM ACT information updated by the TCM generator, and receives from the TCM terminator TIM alarm information, BIP-8 error information, BEI error information, BDI information and TCM ACT information updated by the TCM terminator. The control collects the information conveyed from the TCM generator and the TCM terminator and reports the information to the network management system, and reports to the NM TCM monitored information, the TCM ACT information and the TCM Op information. The TCM monitored information includes a TTI mismatch indication, BIP-8 error statistics, BEI error statistics and BDI failure information.

The TCM generator receives the TCM ACT information, the TCMi Op information, the BDI information and the TTI information from the controller, and performs corresponding TCMi operations including TTI inserting, BIP-8 calculation and inserting, and BEI and BDI information receiving. The TCM generator updates the TCM ACT information to be output according to the TCMi Op information and the received TCM ACT information and conveys the updated information to the controller, and also sends generated TCM OH information and the TCM ACT information to the external overhead interface. The TCM OH includes a TTI identifier, BIP-8 bit interleaved parity information, BEI backward error indication, BDI backward defect indication, etc.

The TCM terminator provides functions including: receiving the TCMi Op information and the TTI expected value information from the controller, receiving a corresponding TCMi overhead from the external overhead interface and performs a TCMi operation, updating the TCM ACT information, and sending the updated TCM ACT information to the controller and the BEI information to the TCM generator. The TCMi operation includes TTI extracting and comparing, TIM alarm information generating, BIP-8 calculating, extracting and comparing, BIP-8 error information generating and sending to the controller, BEI information generating and sending to the TCM generator, BEI error generating and sending to the controller, BDI information generating and sending to the controller for transmission to the TCM generator.

The invention claimed is:

1. A method for automatically implementing Tandem Concatenation Monitoring, TCM, comprising:

requesting, by a sub-network, a network management system for a required number of TCM levels;

assigning, by the network management system, available TCM levels to a pair of network nodes in the sub-network;

performing, by the pair of network nodes in the sub-network, TCM processing, mapping TCM use information into a corresponding overhead, transferring the TCM use information together with TCM overhead information downstream, and reporting TCM information to the network management system, wherein the TCM information comprises TCM monitored information, TCM use information, and TCM operation information;

by comparing the TCM use information and the TCM operation information, determining the TCM levels that pass through each network node and have been used, and which level of TCMi each network node is processing; and extracting, by the network management system, TCM monitored information, determining transmission quality of each of the sub-networks, and locating a network failure.

2. The method for automatically implementing TCM according to claim 1, wherein the process of requesting by each of the sub-networks the network management system for a required number of TCM levels comprises:

determining, by each of the sub-networks, a network segment requiring TCM according to a network distribution relationship of the sub-network, and determining the number of TCM levels required for the network segment according to a monitoring demand of the network segment;

requesting, by the sub-networks, the network management system for the TCM levels.

3. The method for automatically implementing TCM according to claim 1, wherein the process of assigning by the network management system the available TCM levels to the pair of network nodes in the sub-network comprises:

determining, by the network management system, the available TCM levels according to a current TCM assignment map; and receiving, by the sub-networks, information on the available TCM levels assigned by the network management system, and assigning a corresponding TCM level to the pair of network nodes in the sub-network according to the monitoring demand of the sub-network segment.

4. The method for automatically implementing TCM according to claim 1, wherein the TCM processing comprises processing of a Trail Trace Identifier, TTI, a Bit Interleaved Parity, BIP-8, a Backward Error indication, BEI, and a Backward Defect Indication, BDI.

5. The method for automatically implementing TCM according to claim 1, wherein the TCM monitored information reported to the network management system comprises a TTI alarm indication, BIP-8 error statistics, BEI error statistics and BDI failure information.

6. The method for automatically implementing TCM according to claim 1, wherein the TCM overhead information transferred downstream comprises a TTI, a BIP-8, a BEI and a BDI.

7. The method for automatically implementing TCM according to claim 1, wherein after the network management system receives the reported TCM information, the method further comprises updating a TCM assignment map, wherein the reported TCM information received by the network management system comprises the TCM use information and TCM operation information, and the updated TCM assignment map is a basis in assigning TCM levels when another sub-network requests for the TCM levels.

8. A device for automatically implementing Tandem Concatenation Monitoring, TCM, comprising a controller, a TCM generator and a TCM terminator, wherein the controller is adapted to control information transfer with an exterior of the controller as a network element, to report TCM monitored information, TCM use information, and TCM operation information to a network management system, and to control the TCM generator and the TCM terminator;

the TCM generator is adapted to receive information from the controller, to perform TCM processing, to map TCM use information into an overhead for transfer, to update the TCM use information according to the TCM operation information, and to convey updated TCM use information to the controller; and the TCM terminator is adapted to receive information from the controller and an external overhead interface, to process TCM overhead information, to update the TCM use information, and to convey a processing result to the controller.

9. The device for automatically implementing TCM according to claim 8, wherein the network element, when serving as a gateway network element of a sub-network where the network element is located, is adapted to determine a required number of TCM levels for the sub-network where the network element is located, to request network management system the TCM levels as required on behalf of the sub-network where the network element is located, and to send a TCM level to an ordinary network element in the sub-network where the network element is located.

10. The device for automatically implementing TCM according to claim 8, wherein the network element, when serving as an ordinary network element of the sub-network where the network element is located, is adapted to receive available TCM levels sent from a gateway network element of the sub-network where the network element is located.

11. The device for automatically implementing TCM according to claim 8, wherein the controller is adapted to send, to the TCM generator, TCM ACT information containing the TCM levels as used already, TCMi Op information indicating a TCM level at which the present network element operates, BDI information and TTI information, and to send to the TCM terminator the TCMi Op information and a TTI expected value information, TTI Exp information.

12. The device for automatically implementing TCM according to claim 11, wherein the TCM processing comprises TTI inserting, BIP-8 calculating and inserting, and BEI and BDI information receiving.

13. The device for automatically implementing TCM according to claim 9, wherein the controller is adapted to receive from the TCM generator TCM ACT information updated by the TCM generator, to receive, from the TCM terminator, TIM alarm information, BIP-8 error statistics, BEI error statistics, BDI failure information and TCM ACT information updated by the TCM terminator.

14. The device for automatically implementing TCM according to claim 13, wherein the TCM monitored information comprises a TTI mismatch indication, BIP-8 error statistics, BEI error statistics and BDI failure information.

15. The device for automatically implementing TCM according to claim 9, wherein the TCM generator is further adapted to send generated TCM Overhead information and TCM ACT information to the external overhead interface.

16. The device for automatically implementing TCM according to claim 9, wherein the TCM terminator is further adapted to send BEI information to the TCM generator, or to send BDI information to the controller for transmission to the TCM generator.

17. A method for automatically implementing Tandem Concatenation Monitoring, TCM, comprising:

requesting, by a sub-network, a network management system for a required number of TCM levels;

assigning, by the network management system, available TCM levels to a pair of network nodes in the sub-network;

performing, by the pair of network nodes in the sub-network, TCM processing, mapping TCM use information into a corresponding overhead, transferring the TCM use information together with TCM overhead information downstream, and reporting TCM information to the network management system, wherein the TCM information comprises TCM use information and TCM operation information; and by comparing the TCM use information and the TCM operation information, determining the TCM levels that pass through each network node and have been used, and which level of TCMi each network node is processing.

18. The method for automatically implementing TCM according to claim 17, wherein the process of requesting by each of the sub-networks the network management system for a required number of TCM levels comprises:

determining, by each of the sub-networks, a network segment requiring TCM according to a network distribution relationship of the sub-network;

determining the number of TCM levels required for the network segment according to a monitoring demand of the network segment; and requesting, by the sub-networks, the network management system for the TCM levels.

19. The method for automatically implementing TCM according to claim 17, wherein the process of assigning by the network management system the available TCM levels to the pair of network nodes in the sub-network comprises:

determining, by the network management system, the available TCM levels according to a current TCM assignment map; and receiving, by the sub-networks, information on the available TCM levels assigned by the network management system; and assigning a corresponding TCM level to the pair of network nodes in the sub-network according to the monitoring demand of the sub-network segment.

* * * * *